Sept. 9, 1924.
J. M. BROWNE
PROCESS OF TREATING PICKLES
Filed July 12, 1921
1,507,577
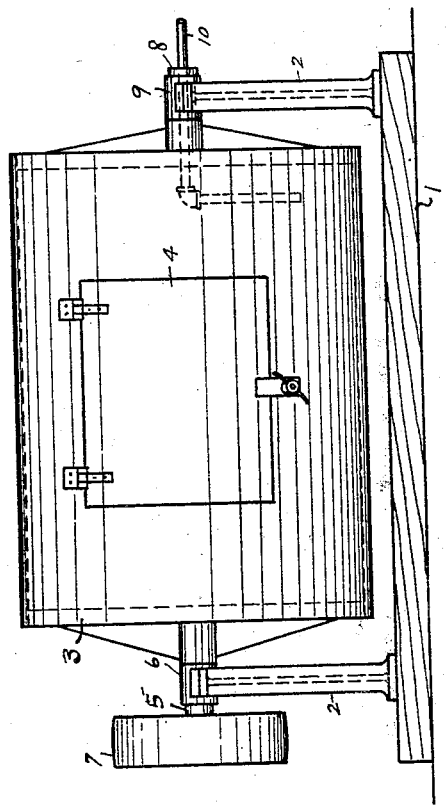
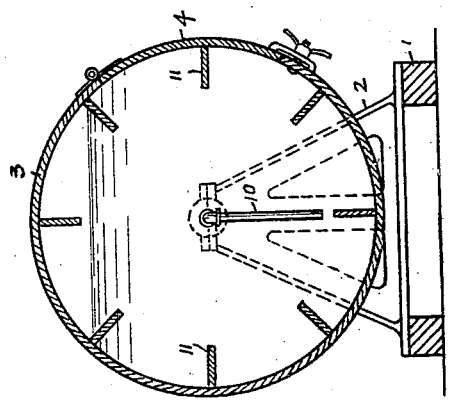
INVENTOR.
John M. Browne
BY
Hardway Cath
ATTORNEYS.

Patented Sept. 9, 1924.

1,507,577

UNITED STATES PATENT OFFICE.

JOHN M. BROWNE, OF HOUSTON, TEXAS.

PROCESS OF TREATING PICKLES.

Application filed July 12, 1921. Serial No. 484,079.

*To all whom it may concern:*

Be it known that JOHN M. BROWNE, a citizen of the United States, residing at Houston, in the county of Harris and State of Texas, has invented certain new and useful Improvements in Processes of Treating Pickles, of which the following is a specification.

This invention relates to new and useful improvements in a process of treating pickles.

One object of the process is to so treat pickles, after they are taken out of the salt brine, as to render them more brittle and wholesome and at the same time to give them a smoother and more attractive appearance.

Another object of the process is to make it possible to treat the pickles in large quantities in such a manner that they will all be subjected to a uniform treatment.

With the above and other objects in view the invention relates to a novel process described in this specification, and preferably carried out by the apparatus disclosed in the accompanying drawings, wherein:—

Figure 1 is a side view of the apparatus, and

Figure 2 is a cross sectional view thereof.
In the drawings the numeral 1 designates a suitable base whereon the end castings 2, 2 are fastened, forming legs. The numeral 3 designates an enclosed cylindrical drum which has a side door 4 through which the drum may be filled, and which, when closed, is steam and water tight. Fixed to one end of the drum there is a shaft 5 which rotates in the bearing 6 of one leg 2. This shaft carries a belt pulley 7 through which the drum may be rotated. The other end of the drum has a tubular stub shaft 8 which rotates in a bearing 9 carried by the other leg. A steam line 10 passes into the drum through the shaft 8 and its inner end is turned downwardly and submerged in the water with which the drum is filled.

Fastened to the inside wall of the drum are the inwardly extending baffles 11, which extend from end to end of the drum.

When the pickles are taken from the salt brine they are in a soft or wilted condition, and more or less tough. A quantity of them are placed in the drum and are submerged in the pure water with which the drum is filled. Hot steam is then forced under pressure into the drum, through the line 10, and this steam is confined within the drum, while the same is rotated, and gradually raises the temperature of the water. The baffles keep the pickles in motion, while the drum is being rotated, so that they are gradually and uniformly heated to the desired temperature, thus causing the pickles to distend to a round smooth contour, presenting a more attractive appearance. The treatment also renders them more brittle and wholesome.

What I claim is:—

1. The process of treating pickles consisting in subjecting them to salt brine, then submerging them in water in a closed receptacle and then heating the contents in said receptacle, meanwhile agitating the same.

2. The process of treating pickles consisting in subjecting them to salt brine, then submerging them in cold water in a closed receptacle then heating said water by forcing hot steam therein under pressure meanwhile agitating the contents thereof.

In testimony whereof I have signed my name to this specification in the presence of two subscribing witnesses.

JOHN M. BROWNE.

Witnesses:
W. H. DUNLAY,
E. V. HARDWAY.